United States Patent Office 3,508,796
Patented Apr. 28, 1970

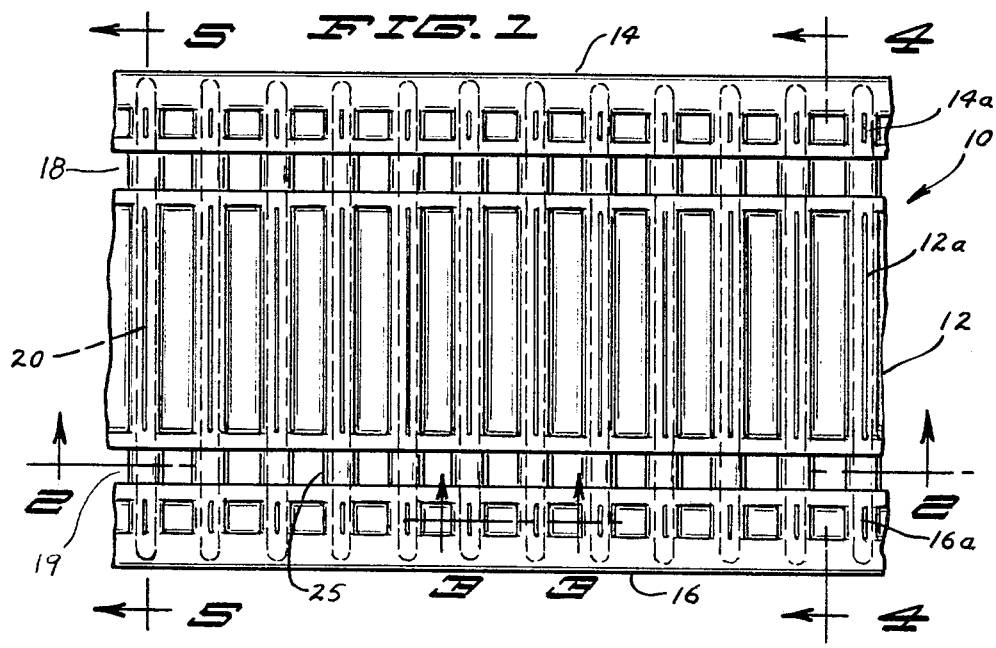
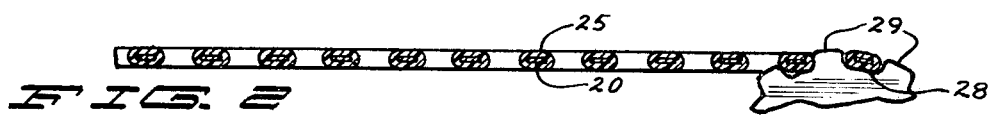
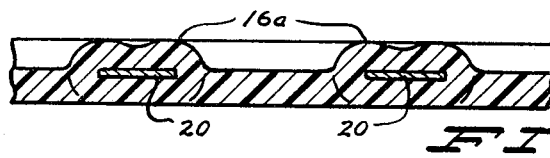
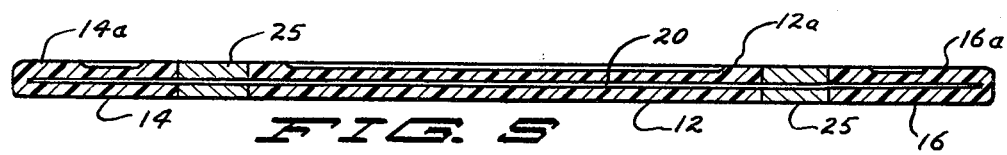
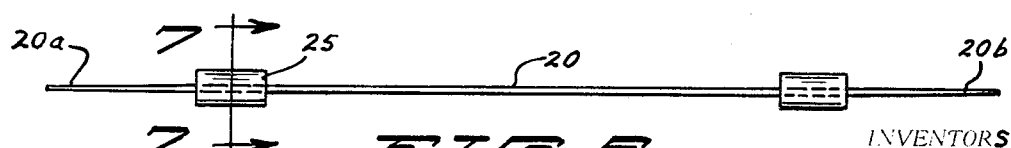
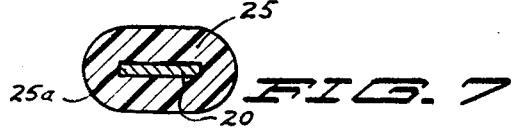
INVENTORS
WILLIAM W. PAULSON
ROGER W. CHERRINGTON
ATTORNEYS April 28, 1970     W. W. PAULSON ET AL     3,508,796
ENDLESS TRACK FOR VEHICLE
Filed Sept. 6, 1968     2 Sheets-Sheet 2
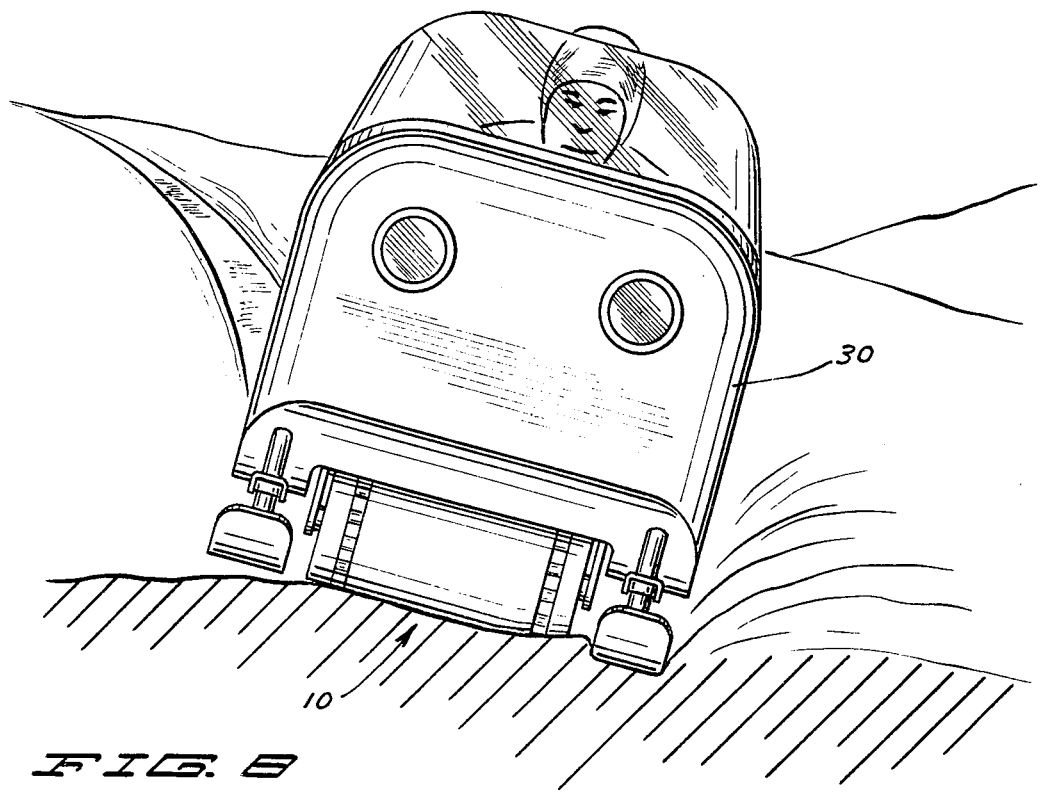
FIG. 8
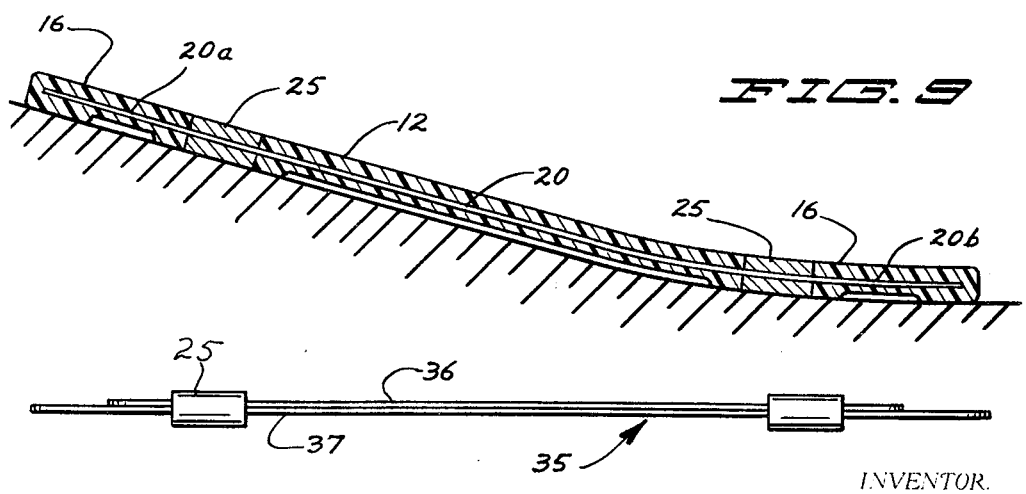
FIG. 9
FIG. 10
INVENTOR.
WILLIAM W. PAULSON
ROGER W. CHERRINGTON
BY
ATTORNEYS

3,508,796
ENDLESS TRACK FOR VEHICLE
William W. Paulson, Braham, Minn. 55006, and Roger W. Cherrington, 900 3rd Ave. W., Pine City, Minn. 55063
Filed Sept. 6, 1968, Ser. No. 757,826
Int. Cl. B62d 55/24
U.S. Cl. 305—38                          3 Claims

ABSTRACT OF THE DISCLOSURE

An endless rubber-like track for a motor vehicle comprising a central body portion and having portions at either side spaced therefrom, transverse flexible rods integral with said portions holding the same in spaced relation and being spaced about said track, driving members carried by said rods between said body portion and the portions spaced at either side thereof, said driving members being engaged by the sprockets driving said track and said rods yielding and flexing with a transverse bending of said track in traversing irregular terrain and in banking in progressing through a curve.

BACKGROUND AND SUMMARY OF THE INVENTION

The subject matter of the invention herein is related particularly to use in connection with a type of vehicle commonly known as a snowmobile. The vehicles are moved by means of a sprocket driven endless track. The tracks in common use generally comprise a rubber-like body portion having openings therein to receive sprocket teeth and have stiff transverse rods for strengthening the track. Examples of such tracks are the structures disclosed in the U.S. Letters Patent Nos. 3,282,630 to Harrison et al., and 2,899,242 to Bombardier.

The vehicle must of necessity bank in describing a curve. Banking subjects the track to a transverse strain. While the body portion of the belt is capable of flexing, the rigid rods integral therewith are not bendable with a result that they in time break through the belt requiring a replacement of links, as in Harrison, or a replacement of the track, as in Bombardier. Also, as in Bombardier, the sprocket driving the track places a considerable strain upon the rubber-like portion of the belt structure.

The subject matter of the invention herein comprises novel subject matter which avoids the objectionable conditions above indicated. The novel structure herein provides reinforcing rods which have a flexibility to correspond to that of the otherwise belt structures and provides for the driving sprocket to engage members carried by said rods.

Generally stated, the invention herein comprises an endless track having a central body portion and portions spaced therefrom at either side thereof, transverse flexible rods integral with said portions holding the same in spaced relation and carrying members disposed between said spaced portions for engagement by the sprockets driving said track.

It is an object of this invention therefore to provide an endless track for a motor vehicle having such a construction as to have transverse flexibility in banking in describing a curve.

It is another object of the invention herein to provide an endless track embodying the use of reinforcing cross members having such flexibility as to correspond to a transverse yielding of said track.

It is also an object of this invention to provide an endless track structure wherein the members engaged by a driving sprocket are carried between spaced portions of said track.

These and other objects and advantages of the invention will be set forth in the following description made in connection with the accompanying drawings in which like reference characters refer to similar parts throughout the several views and in which FIG. 1 is a top plan fragmentary view with portions thereof shown in dotted line;

FIG. 2 is a view in longitudinal vertical section taken on line 2—2 of FIG. 1;

FIG. 3 is an enlarged broken view in longitudinal vertical section taken on line 3—3 of FIG. 1;

FIG. 4 is a view in vertical cross section taken on line 4—4 of FIG. 1;

FIG. 5 is a view in vertical cross section taken on line 5—5 of FIG. 1;

FIG. 6 is a view in elevation of a detail of the invention;

FIG. 7 is an enlarged view in vertical section taken on line 7—7 of FIG. 6;

FIG. 8 is a view in perspective of a vehicle embodying the invention herein;

FIG. 9 is a view in vertical cross section similar to FIG. 5 showing a detail of the track structure in a flexed condition, as indicated by the position of the track in FIG. 8; and FIG. 10 is a view similar to FIG. 7 showing a modification thereof.

DESCRIPTION OF A PREFERRED EMBODIMENT

Referring to the drawings, the endless track comprising the invention herein is indicated generally by the reference numeral 10. A sufficient portion of said track is shown for a full disclosure herein. The motor vehicle driven by said track is not here shown but will be of a type commonly known as a snowmobile.

Said track comprises a central body portion 12 and side body portions 14 and 16 of narrower width spaced therefrom at either side thereof. Said body portions will be made of a fabric of rubber-like composition suitable for the purposes required thereof. The invention herein has to do with the elements of the product comprising said endless track 10 and not the method of assembly or manufacture.

The inner side of said track 10 will have a smooth or uniform surface. The outer or ground engaging surface of said track will have transverse raised rib or cleat-like portions as indicated by the reference numerals 12a, 14a and 16a.

Holding said body portions of said track in transverse spaced relation and reinforcing the same are like transverse rods 20 of a sufficient number to be spaced about said belt. The spaced areas between said track portions are strip-like and are indicated by the reference numerals 18 and 19. Said spaces are of a sufficient width to accommodate members to be engaged by sprockets as will be described.

Said rods are embedded in said body portions to be integral therewith. By conventional methods said rods will be positioned between upper and lower layers of said body portions to be bonded into an integral structure.

Said rods are flat and are indicated as being relatively wide with respect to their thickness, as indicated in FIGS. 3 and 7, and have tapered end portions 20a and 20b, as indicated in FIG. 6. Said rods are very suitably made of a spring-like metal material, such as of spring steel, to have transverse flexibility. The tapered end portions of said rods have more responsive flexibility than do the central portions of said rods. Hence the rod construction permits a flexibility and yielding characteristic compatible with that which is required of the track in banking about a curved passage. There is a transverse strain placed upon the track in going through a curve. The flexibility of the reinforcing rods in flexing compatibly with the rubber-like body portions of the track greatly minimizes said strain and relieves the otherwise tendency of a rigid rod to break through the fabric of said track.

Carried on each of said rods 20 to be disposed within said spaces 18 and 19 are track driving members 25. Said members in being disposed within said spaces 18 and 19 are of a length sufficient to accommodate engagement therewith of sprocket teeth. Said members will be formed of a suitable metal and are generally of an elongated oval form in cross section having somewhat flattened upper and lower surfaces, as indicated in FIG. 7, and each having a slot 25a extending longitudinally therethrough to accommodate the portion of a rod 20 extending therethrough and upon which said members are carried. Said members are secured in position by being held between the adjacent body portions of said track.

It will be noted here that said rods 20 are spaced apart sufficiently as to carry said track driving members 25 in such spaced relation as to accommodate sprocket teeth therebetween.

A track member of the character indicated here is conventionally driven by a sprocket such as the sprocket indicated by the reference numeral 28 which in turn will be conventionally driven by a motor. The teeth 29 of said sprocket will engage said driving members 25 to drive the same. There is no engagement of the fabric of the track by the sprocket. Engagement is with the driving members 25 only which spread or distribute the load of the engagement across the width of the track. In FIG. 8, a conventional type of vehicle is shown which embodies the use of the track described herein.

In use, the track will be sprocket driven in a conventional manner. The construction embodying the use of the rod held driving members 25 distributes the load applied by the sprocket across the width of the belt avoiding any given strain points. The rods 20 extend the full width of the track in its integral construction therewith.

Tha rods 20 yield very nicely in flexing transversely with the fabric of the track in banking through a curve or turn, as indicated in FIGS. 8 and 9. With a conventional track due to the rigidity of the reinforcing transverse rods conventionally used, in banking, the track is put under great strain, as the track is under pressure to dig into the terrain in banking through a curve by the action of the vehicle. The tendency of the fabric of the belt would be to flex whereby there is a strain point at each end of the rods embedded in the fabric of the track. After some use, the tendency is for the rods to break through the fabric.

With reference to FIG. 10, a modification is shown of the structure of the rod 20 in the form of a member 35 comprising a pair of superposed rod portions 36 and 37. The rod portion 37 will be more closely adjacent the ground-engaging or outer side or surface of said track 10, and this rod is somewhat longer than the rod portion 36 extending beyond each end thereof. The combined thickness of the rod portions 36 and 37 will approximate the thickness of said rod 20 above described though are here illustrated on a somewhat larger scale. Both rods are embedded in and are integral with the three portions 12–14 of said track 10.

In banking through a curve, the tip portions of the longer rod portion 37 will yield adjacent the driving members 25 and adjacent the adjacent ends of the shorter rod portions 36 and thus will tend to define a curvature instead of a sharp bend adjacent the driving members 25 as might tend to be the case of a unitary or single rod construction of uniform cross sectional dimension. There will be a transverse yielding of the fabric of said track 10 to accommodate the small amount of movement in a flexing of said members 35.

The construction herein embodying the use of flexible transverse rods permits the rods to flex compatibly with the natural flexing of the fabric of the track as it banks through a curve or turn thus avoiding the development of strain at the portions adjacent the ends of each rod. The flexing of the rods from the driving members 25 outwardly defines a curve instead of a sharp bend or stress point adjacent said driving members.

Thus it is seen that there is provided herein a significantly improved endless track for a motor vehicle.

What is claimed is:

1. An endless sprocket driven track for a motor vehicle comprising
   a central body portion and body portions at either side thereof spaced therefrom, all of said portions being formed of a flexible material,
   flexible transverse rods of rectangular cross section integral with said portions connecting and holding the same in spaced relation and being spaced longitudinally about said track, said rods having a flexibility compatible with the flexibility of said body portions in bending with said track banking through a curve,
   means carred by said rods between said spaced body portions for engagement by driving sprockets, and
   said rods being spoced longitudinally of said track a sufficient distance apart to accommodate said driving sprockets, said rods tapering in thickness at each end portion outwardly of the sprocket engaging portions thereof for greater flexibility at said end portions than at the central portion thereof.

2. The structure set forth in claim 1, wherein
   said sprocket engaged means carried by said rods comprise metal members retained on said rods between adjacent of said body portions.

3. An endless sprocket driven track for a motor vehicle comprising
   a central body portion and body portions at either side thereof spaced therefrom, all of said portions being formed of a flexible material,
   a flexible transverse rods of rectangular-cross section integral with said portions connecting and holding the same in spaced relation and being spaced longitudinally about said track, said rods having a flexibilty compatible with the flexibility of said body portions in bending with said track banking through a curve,
   means carried by said rods between said spaced body portions for engagement by driving sprockets, and
   said rods being spaced longitudinally of said track a sufficient distance apart to accommodate said driving sprockets,
   said transverse rods each comprising a pair of superposed portions, one of said portions being more closely adjacent the ground-engaging surface of said track and extending a short distance beyond the ends of the other portion thereof, the other of said portions terminating slightly beyond each sprocket engaging portion.

References Cited

UNITED STATES PATENTS

| | | | |
|---|---|---|---|
| 2,899,242 | 8/1959 | Bombardier | 305—38 |
| 3,285,677 | 11/1966 | Marier | 305—38 |
| 3,416,845 | 12/1968 | Scanland | 305—38 |
| 3,451,729 | 6/1969 | Roy | 305—38 |

RICHARD J. JOHNSON, Primary Examiner